(12) United States Patent
Akimoto et al.

(10) Patent No.: US 8,416,202 B2
(45) Date of Patent: Apr. 9, 2013

(54) DISPLAY DEVICE HAVING TOUCH PANEL

(75) Inventors: Hajime Akimoto, Kokubunji (JP);
Yasuharu Yatsu, Chiba (JP); Hiroshi Kageyama, Hachioji (JP); Noriharu Matsudate, Kujukuri (JP); Naruhiko Kasai, Yokohama (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1066 days.

(21) Appl. No.: 12/379,031

(22) Filed: Feb. 11, 2009

(65) Prior Publication Data

US 2009/0201267 A1  Aug. 13, 2009

(30) Foreign Application Priority Data

Feb. 13, 2008 (JP) ................. 2008-031915

(51) Int. Cl.
*G06F 3/041* (2006.01)
*G02F 1/1333* (2006.01)
*H01L 23/52* (2006.01)

(52) U.S. Cl.
USPC ............ 345/173; 349/58; 349/150; 257/780; 257/778

(58) Field of Classification Search .................. 345/173; 324/257; 349/149
See application file for complete search history.

(56) References Cited

U.S. PATENT DOCUMENTS

| 5,666,270 A * | 9/1997 | Matsuda et al. ............ 361/704 |
| 6,171,887 B1 * | 1/2001 | Yamaji ........................ 438/106 |
| 7,002,812 B2 * | 2/2006 | Sakaki ........................ 361/803 |
| 7,164,460 B2 * | 1/2007 | Hagiwara .................... 349/149 |
| 7,859,634 B2 * | 12/2010 | Isami et al. .................. 349/152 |
| 2002/0101399 A1 * | 8/2002 | Kubo et al. .................. 345/104 |
| 2007/0257893 A1 * | 11/2007 | Philipp et al. ............... 345/173 |
| 2008/0084530 A1 * | 4/2008 | Hirabayashi et al. ........ 349/150 |
| 2008/0303798 A1 * | 12/2008 | Matsudate et al. .......... 345/173 |

FOREIGN PATENT DOCUMENTS

| JP | 2002-342014 | 5/2001 |
| JP | 2008-305036 | 6/2007 |
| JP | A-2008-305036 | 6/2007 |

* cited by examiner

*Primary Examiner* — Bipin Shalwala
*Assistant Examiner* — Benyam Ketema
(74) *Attorney, Agent, or Firm* — Stites & Harbison PLLC; Juan Carlos A. Marquez, Esq.

(57) ABSTRACT

The present invention realizes the reduction of cost of a display device having a touch panel. The display device having a touch panel includes a display panel, and a touch panel which is arranged on the display panel in an overlapping manner in plane. The touch panel includes a first substrate and a second substrate which are arranged to face each other with spacers sandwiched therebetween, and a first semiconductor chip which is mounted on the first substrate. The first substrate includes, on a surface side thereof which faces the second substrate, a plurality of first lines which is arranged parallel to each other in the first direction, a first chip mounting region on which the first semiconductor chip is mounted, and a plurality of first connection portions each of which is constituted of a portion of each line in the plurality of first lines, the first semiconductor chip includes a plurality of first bump electrodes which is arranged in one direction, the plurality of first connection portions are arranged in the arrangement direction of the plurality of first bump electrodes within the first-chip mounting region, and an arrangement pitch of the plurality of first bump electrodes is set larger than an arrangement pitch of the plurality of first connection portions.

8 Claims, 10 Drawing Sheets

DISPLAY DEVICE HAVING TOUCH PANEL

CROSS-REFERENCE TO RELATED APPLICATIONS

The present application claims priority from Japanese Application JP 2008-31915 filed on Feb. 13, 2008, the content of which is hereby incorporated by reference into this application.

BACKGROUND OF THE INVENTION

1. Field of the Invention

The present invention relates to a display device having a touch panel, and more particularly to a display device having a touch panel which mounts a touch panel on a display panel.

2. Description of the Related Art

As a detection method of a conventional touch panel, a detection method which detects a change of light and a detection method which detects a change of an electric property have been mainly used. With respect to a detection method which detects a change of an electric property, conventionally, a resistance film method and a capacitance method have been known. Further, before the advent of the resistance film method, as described in JP-A-2002-342014 (patent document 1), there has been known a method in which transparent electrodes are formed in a stripe shape, the stripe-shaped electrodes intersect with each other, and intersecting points are arranged in a matrix array.

On the other hand, inventors of the present invention have previously made proposal on a touch panel which adopts the novel detection structure and have already filed a patent application on the touch panel (see JP-A-2008-305036 (patent document 2)). The touch panel described in patent document 2 is a touch panel which includes a pair of substrates which arranges electrodes on opposedly-facing surfaces thereof, and spacers which maintain a gap between the pair of substrates. One of the pair of substrates forms metal lines on a resin film. According to the invention described in patent document 2, the basic recognition structure can be realized by adhering the resin films having metal lines to each other by way of the spacers and hence, it is possible to manufacture a highly durable touch panel which allows multi-point inputting at a low cost.

SUMMARY OF THE INVENTION

In general, with respect to the touch panel disclosed in the patent document 2, the lines formed on the substrate and the bump electrodes of the semiconductor chip are connected with each other on a 1:1 basis. Accordingly, the accurate alignment is necessary for connecting the lines formed on the substrate and the bump electrodes of the semiconductor chip and this accurate alignment pushes up a manufacturing cost of the touch panel and, eventually, a manufacturing cost of a display device having a touch panel.

It is an object of the present invention to provide a technique which can realize the reduction of a manufacturing cost of a display device having a touch panel.

The above-mentioned and other objects and novel features of the present invention will become apparent from the description of this specification and attached drawings.

To briefly explain typical invention among inventions disclosed in this application, they are as follows.

(1) The present invention is directed to a display device having a touch panel which includes: a display panel; and a touch panel which is arranged on the display panel in an overlapping manner in plane, wherein the touch panel includes a first substrate and a second substrate which are arranged to face each other with spacers sandwiched therebetween, and a first semiconductor chip which is mounted on the first substrate, the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines, the first semiconductor chip includes a plurality of first bump electrodes which is arranged in one direction, the plurality of first connection portions are arranged in the arrangement direction of the plurality of first bump electrodes within the first-chip mounting region, and an arrangement pitch of the plurality of first bump electrodes is set larger than an arrangement pitch of the plurality of first connection portions.

(2) The present invention is also directed to a display device having a touch panel which includes: a display panel; and a touch panel which is arranged on the display panel in an overlapping manner in plane, wherein the touch panel includes a first substrate and a second substrate which are arranged to face each other with spacers sandwiched therebetween, and a first semiconductor chip which is mounted on the first substrate, the first substrate includes, on a surface side thereof which faces the second substrate, a plurality of first lines which is arranged parallel to each other in the first direction, a first chip mounting region on which the first semiconductor chip is mounted, and a plurality of first connection portions each of which is constituted of a portion of each line in the plurality of first lines, the first semiconductor chip includes a plurality of first bump electrodes which is arranged in one direction, the plurality of first connection portions is arranged in the arrangement direction of the plurality of first bump electrodes within the first-chip mounting region, and the number of the plurality of first bump electrodes is set smaller than the number of the plurality of first connection portions.

(3) In the display device having the constitution (1) or (2), the plurality of first connection portions includes a connection portion which is not connected with the first bump electrode.

(4) In the display device having the constitution (1) or (2), the plurality of first bump electrodes includes bump electrodes which are connected with n ($n \geq 2$) or more pieces of first connection portions.

(5) In the display device having any one of the constitutions (1) to (4), a width of each line in the plurality of first connection portions is set smaller than a distance between two neighboring first bump electrodes.

(6) In the display device having any one of the constitutions (1) to (5), the touch panel includes a second semiconductor chip which is mounted on the second substrate, the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines, the second semiconductor chip includes a plurality of second bump electrodes which is arranged in one direction, the plurality of second connection portions is arranged in the arrangement direction of the plurality of second bump electrodes within a second-chip mounting region, and an arrangement pitch of the plurality of second bump electrodes is set larger than an arrangement pitch of the plurality of second connection portions.

(7) In the display device having any one of the constitutions (1) to (5), the touch panel includes a second semiconductor chip which is mounted on the second substrate, the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines, the second semiconductor chip includes a plurality of second bump electrodes which is arranged in one direction, the plurality of second connection portions is arranged in the arrangement direction of the plurality of second bump electrodes within a second-chip mounting region, and the number of the plurality of second bump electrodes is set smaller than the number of the plurality of second connection portions.

(8) In the display device having the constitution (6) or (7), the plurality of second connection portions includes a connection portion which is not connected with the second bump electrode.

(9) In the display device having the constitution (6) or (7), the plurality of second bump electrodes include bump electrodes which are connected with n (n≧2) or more pieces of second connection portions.

(10) In the display device having any one of the constitutions (6) to (9), a width of each line in the plurality of second connection portions is set smaller than a distance between two neighboring second bump electrodes.

To briefly explain advantageous effects which are obtained by typical invention among inventions disclosed in this application, they are as follows.

According to the present invention, it is possible to realize the reduction of cost of the display device having a touch panel.

DESCRIPTION OF THE PREFERRED EMBODIMENTS

Hereinafter, embodiments of the present invention are explained in detail in conjunction with drawings. Here, in all drawings for explaining the embodiments of the present invention, parts having identical functions are given same symbols and their repeated explanation is omitted.

Embodiment 1

In the embodiment 1, the explanation is made with respect to an example in which the present invention is applied to a display device having a touch panel which mounts a touch panel on an organic EL display panel as one example of a display panel, for example.

Figure 1:
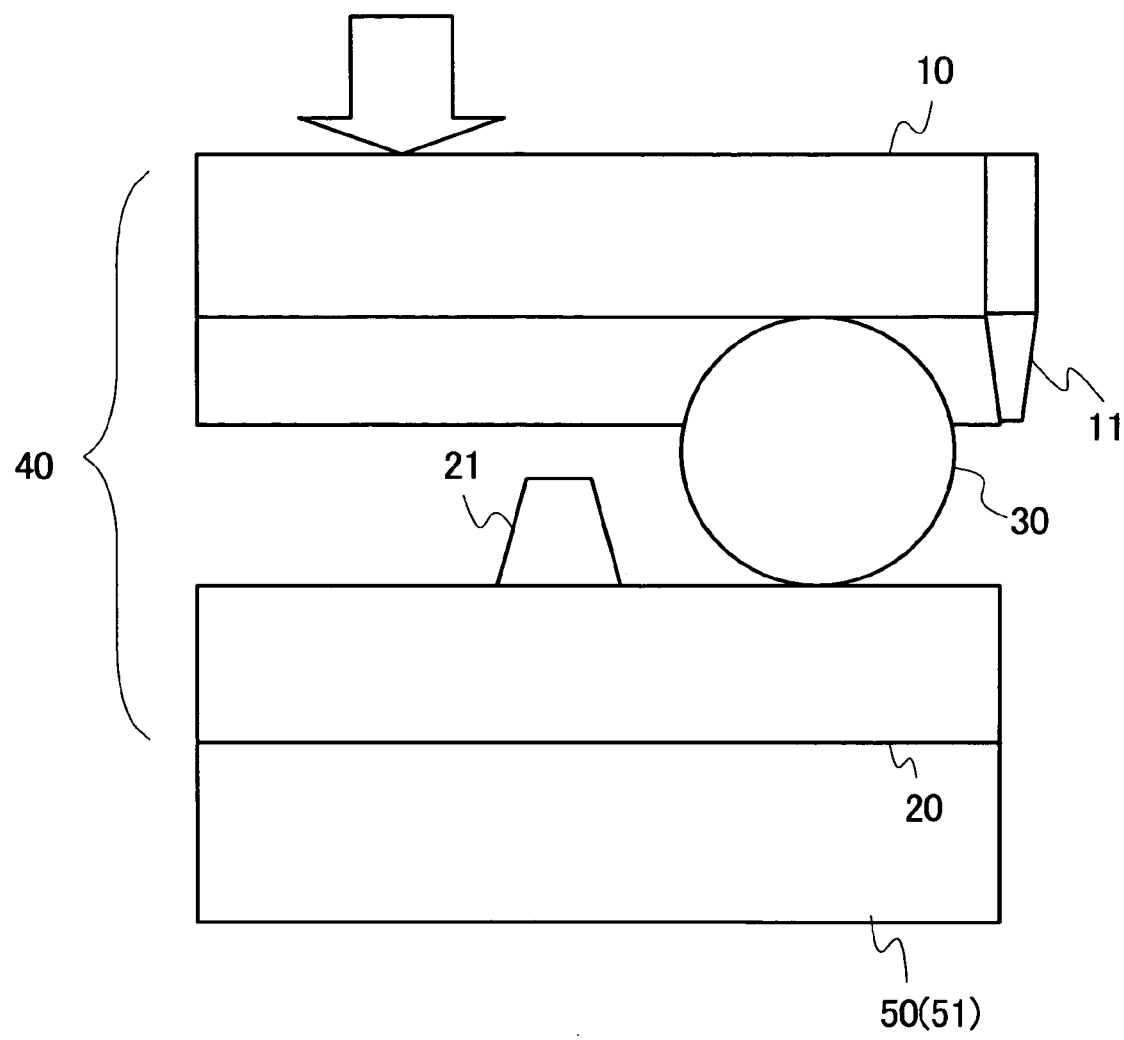
FIG. 1 is a cross-sectional view of a display device having a touch panel of an embodiment 1 according to the present invention.

FIG. 1 is a cross-sectional view of the display device having a touch panel of the embodiment 1 according to the present invention.

As shown in FIG. 1, the display device having a touch panel of the embodiment 1 includes a display panel 50, and a touch panel 40 which is arranged on the display panel 50 in an overlapping manner in plane. In this embodiment, an organic EL display panel 51 is adopted as the display panel 50, for example, and the touch panel 40 is arranged on the organic EL display panel 51.

Figure 8:
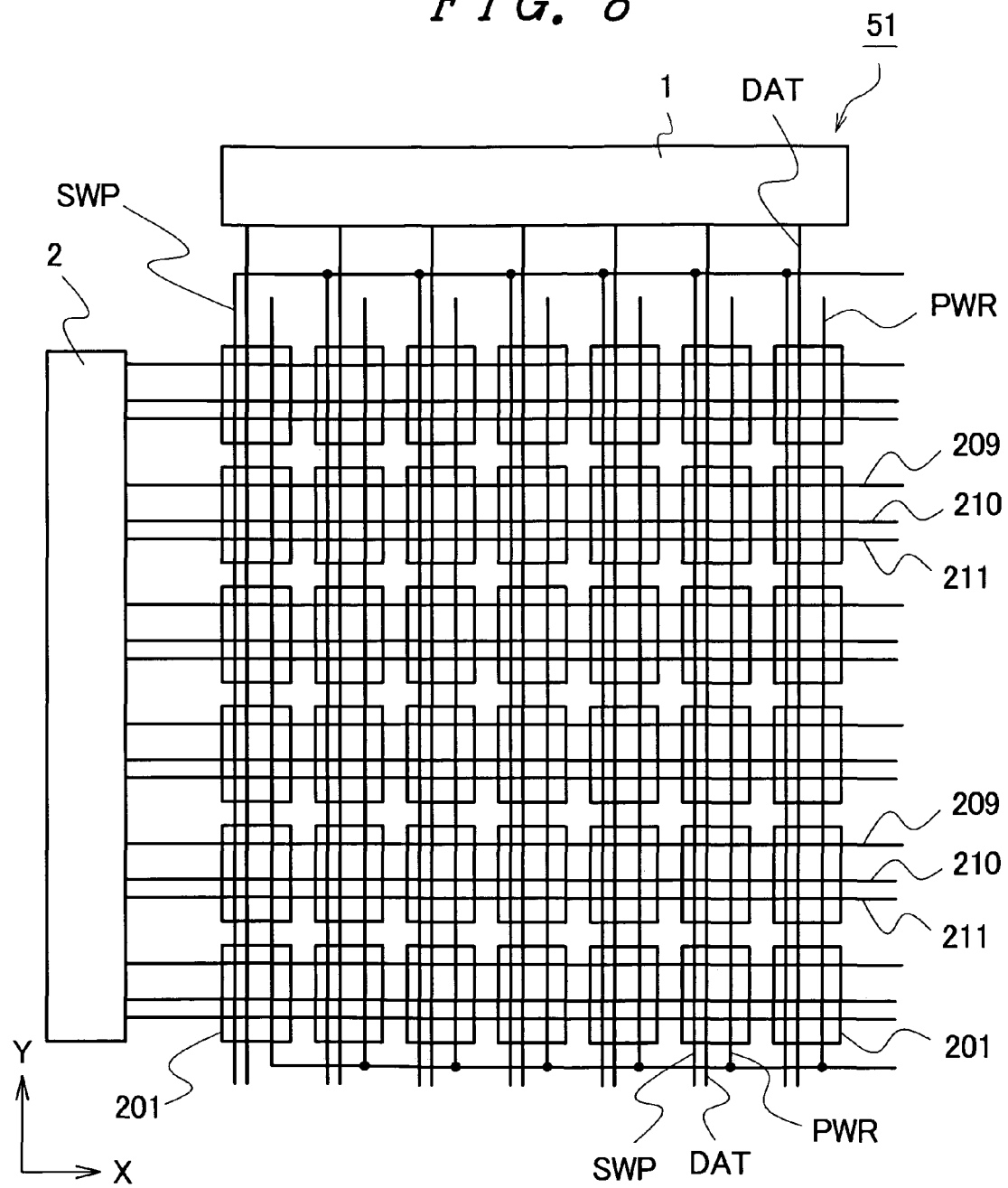
FIG. 8 is a block diagram of a display part of the display panel in FIG. 1.

FIG. 8 is a block diagram of a display part of the display panel (organic EL display panel) shown in FIG. 1.

As shown in FIG. 8, in the display part (display screen) of the organic EL display panel 51, as viewed in a plan view, a plurality of pixels 201 is arranged in the X direction as well as in the Y direction which intersects with the X direction in a matrix array. Further, in the display part of the organic EL display panel 51, pixel switch control lines 209, triangular-wave switch control lines 210 and reset switch control lines 211 which extend in the X direction are arranged. Further, in the display part of the organic EL display panel 51, triangular-wave lines SWP, signal lines DAT and power source lines PWR which extend in the Y direction are arranged.

A plurality of pixel switch control lines 209, a plurality of triangular-wave switch control lines 210 and a plurality of reset switch control lines 211 are respectively arranged at predetermined intervals in the Y direction, and a scanning circuit 2 is arranged on one end side of these lines. A plurality of triangular-wave lines SWP, a plurality of signal lines DAT and a plurality of power source lines PWR are arranged at predetermined intervals in the X direction, and a signal circuit 1 is arranged on one end side of these lines.

Figure 9:
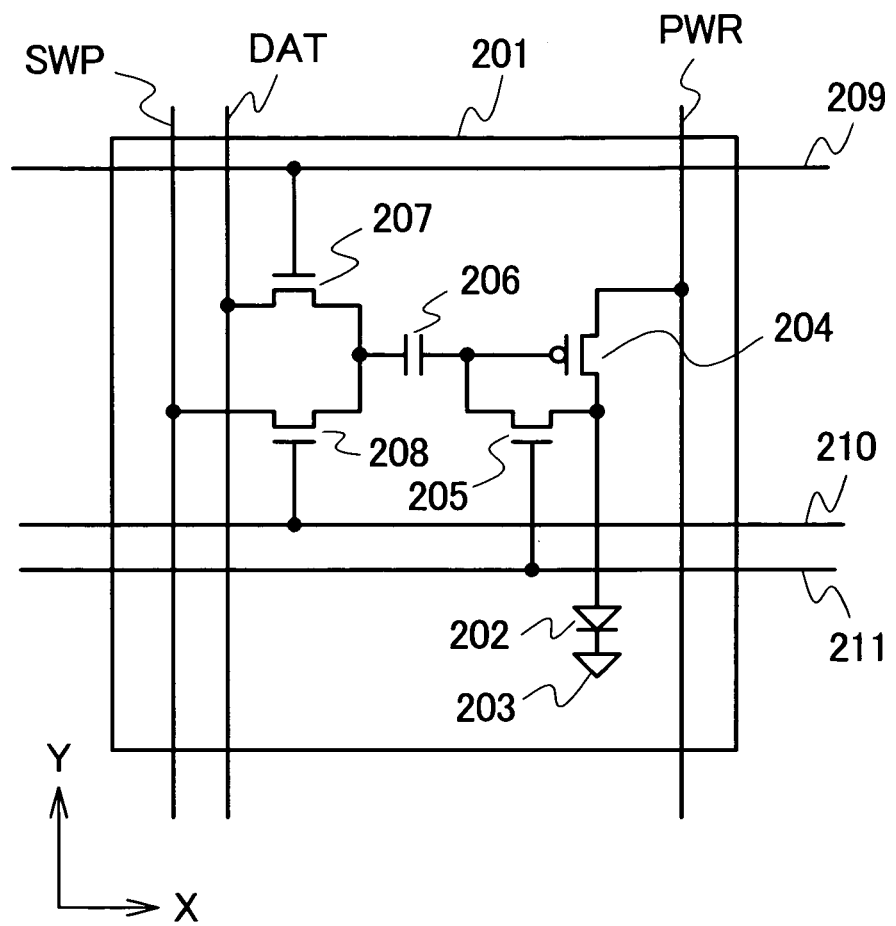
FIG. 9 is a circuit diagram of a pixel shown in FIG. 8.

FIG. 9 is a circuit diagram of the pixel shown in FIG. 8.

An organic EL element 202 is formed in each pixel 201, one end of the organic EL element 202 is connected to a common electrode 203, and the other end of the organic EL element 202 is connected to the power source line PWR via a drive TFT (Thin Film-Transistor) 204. A reset switch 205 is connected between a gate and a drain of the drive TFT 204. Further, the gate of the drive TFT 204 is connected to a pixel switch 207 which is connected to the signal line DAT via a storage capacitance 206 and a triangular-wave switch 208 which is connected to the triangular-wave line SWP via the storage capacitance 206. Here, the reset switch 205 is controlled in response to a signal supplied from the reset switch control line 211, the pixel switch 207 is controlled in response to a signal supplied from a pixel switch control line 209, and the triangular-wave switch 208 is controlled in response to a signal supplied from the triangular-wave switch control line 210.

Next, the manner of operation of this display part (display screen) is explained.

In the pixel which is selected for writing, first of all, the pixel switch 207 is turned on in response to a signal voltage from the pixel switch control line 209, and the reset switch 205 is turned on in response to a signal voltage from the reset switch control line 211. The triangular-wave switch 208 is in an OFF state in response to a signal voltage from the triangular-wave switch control line 210. Then, an electric current flows in the organic EL element 202 from the power source line PWR via the drive TFT 204 connected by the diode connection. Here, the drive TFT 204 and the organic EL element 202 constitute an inverter circuit which uses the gate of the drive TFT 204 as an input and uses a middle point between the drive TFT 204 and the organic EL element 202 as an output. At this point of time, the input and the output of the inverter circuit are short-circuited by the reset switch 205. Here, an input middle point voltage for inverting an inverter is generated in the input and the output of the inverter circuit, and the input middle point voltage is inputted to one end of the storage capacitance 206. Further, a signal voltage which is applied to the signal line DAT is inputted to another end of the storage capacitance 206 via the pixel switch 207. Next, when the reset switch 205 is turned off in response to a signal voltage from the reset switch control line 211, a differential voltage between the input middle point voltage and the signal voltage is stored in the storage capacitance 206. By performing the above-mentioned steps, the writing operation is completed.

Next, when the writing is shifted to pixels on the next line, the pixel switch 207 is changed over to an OFF state in response to a signal voltage from the pixel switch control line 209 and, at the same time, the triangular-wave switch 208 is turned on in response to a signal voltage from the triangular-wave switch control line 210. Here, a triangular-wave sweep voltage is applied to the triangular-wave line SWP, and the triangular-wave voltage is inputted to another end of the storage capacitance 206 via the triangular-wave switch 208. Here, the triangular-wave voltage is a voltage which substantially includes a signal voltage, and when the triangular-wave voltage becomes equal to the signal voltage which is preliminarily written in the storage capacitance 206, the previous middle point voltage is regenerated in the gate of the drive TFT 204 due to a function of the storage capacitance 206. That is, due to a relationship in magnitude between the triangular-wave voltage and the written signal voltage, an ON/OFF operation of the inverter circuit output which uses a middle point between the drive TFT 204 and the organic EL element 202 as the output can be controlled with time. When the inverter circuit is turned on, the organic EL element 202 is surely turned on, while when the inverter circuit is turned off, the organic EL element 204 is surely turned off and hence, by controlling the signal voltage with respect to a predetermined triangular-wave voltage, an ON time of each pixel within one frame period can be controlled thus displaying an image on an organic EL display.

An example of this display technique is described in detail in JP-A-2003-5709 or the like, for example.

In the embodiment 1, the touch panel 40 is arranged on such a display screen. Next, the touch panel 40 is explained in conjunction with FIG. 1 to FIG. 7.

Figure 2:
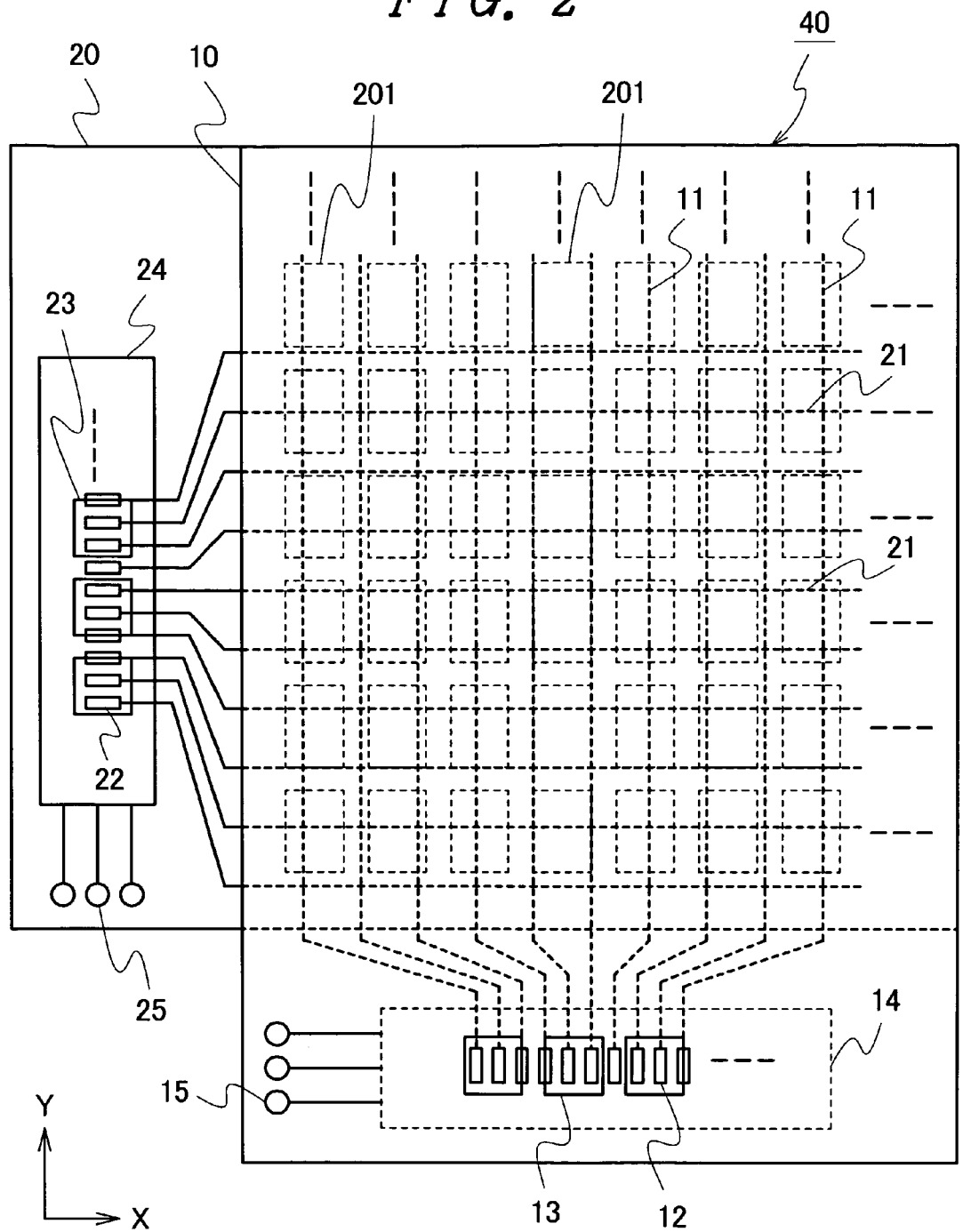
FIG. 2 is a plan view of the touch panel shown in FIG. 1.

FIG. 2 is a plan view of the touch panel in FIG. 1.

Figure 3:
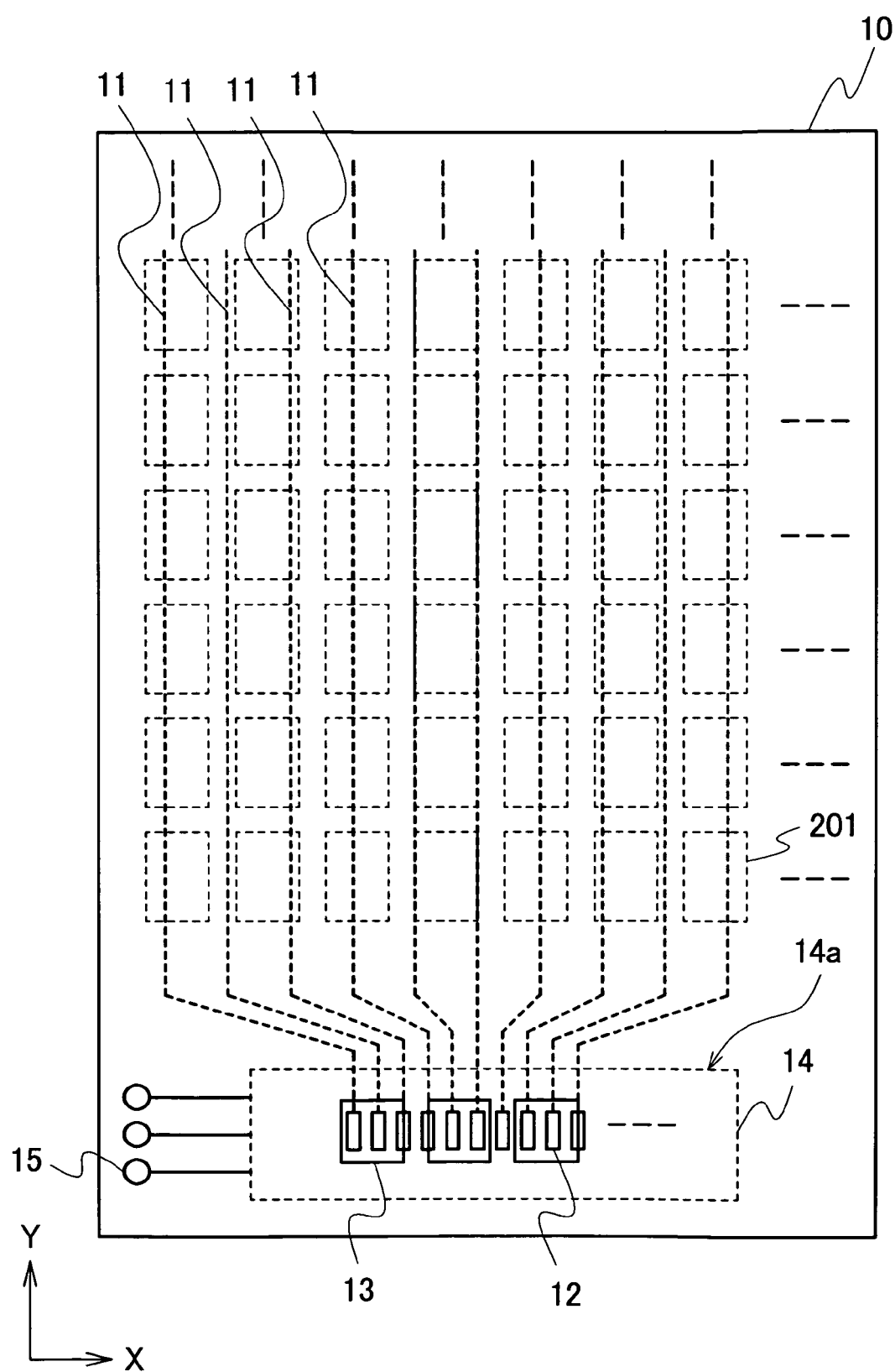
FIG. 3 is a plan view of a first substrate (upper substrate) which constitutes the touch panel shown in FIG. 1.

FIG. 3 is a plan view of a first substrate (upper substrate) which constitutes the touch panel in FIG. 1.

Figure 4:
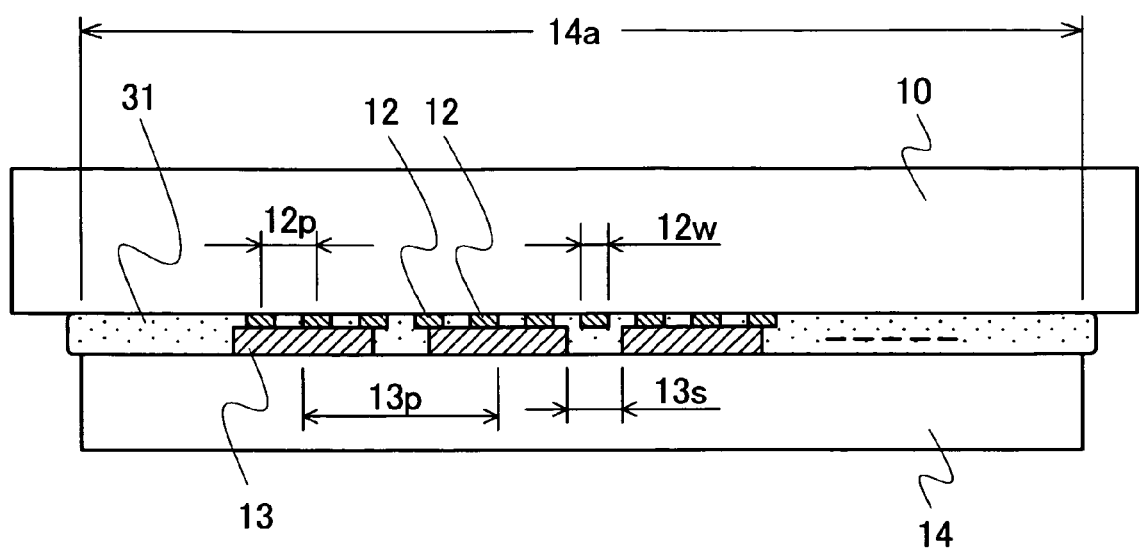
FIG. 4 is a cross-sectional view showing a mounting state of a semiconductor chip shown in FIG. 3.

FIG. 4 is a cross-sectional view showing a mounting state of the semiconductor chip (scanning circuit IC) in FIG. 3.

Figure 5:
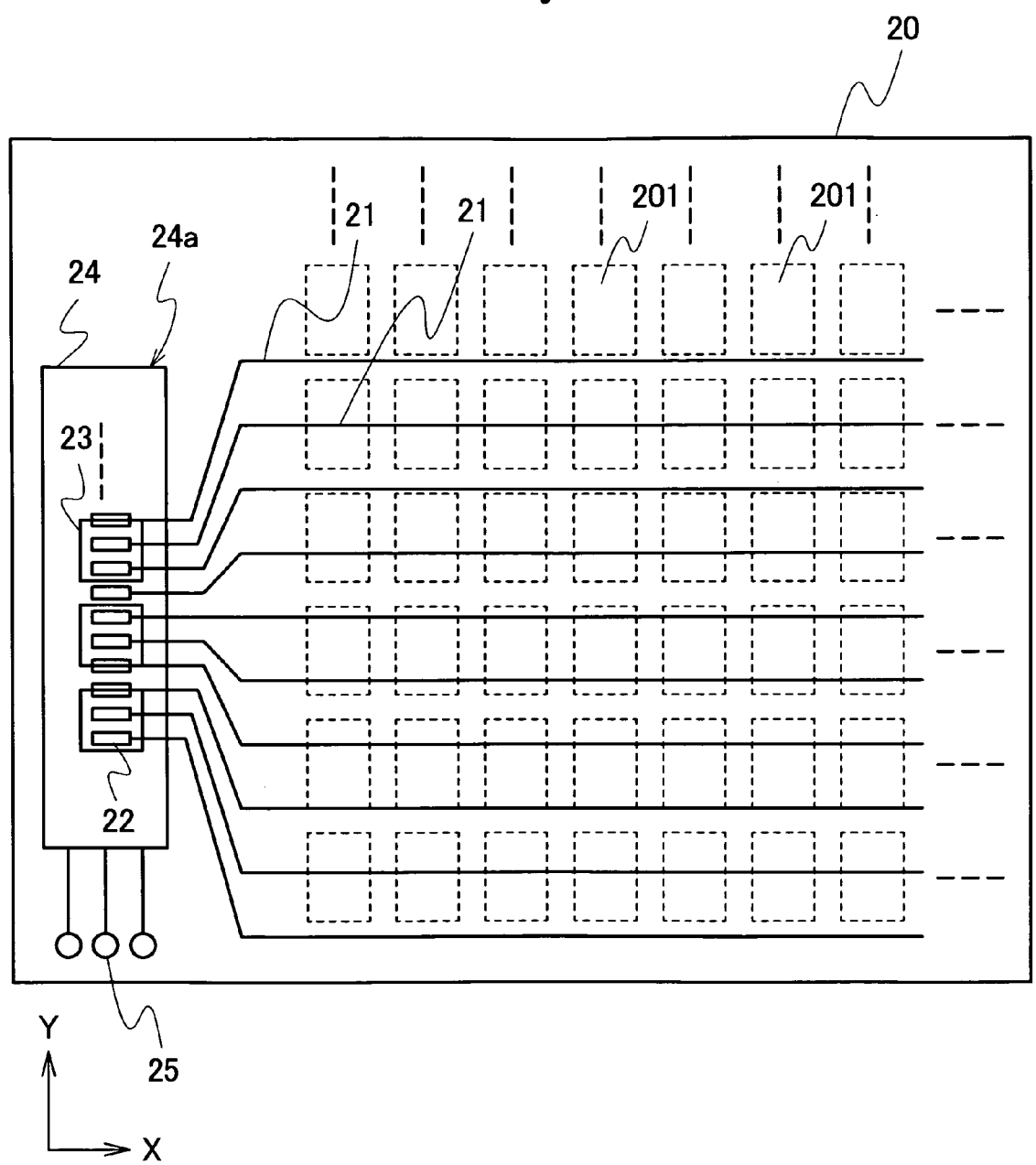
FIG. 5 is a plan view of a second substrate (lower substrate) which constitutes the touch panel in FIG. 1.

FIG. 5 is a plan view of a second substrate (lower substrate) which constitutes the touch panel in FIG. 2.

Figure 6:
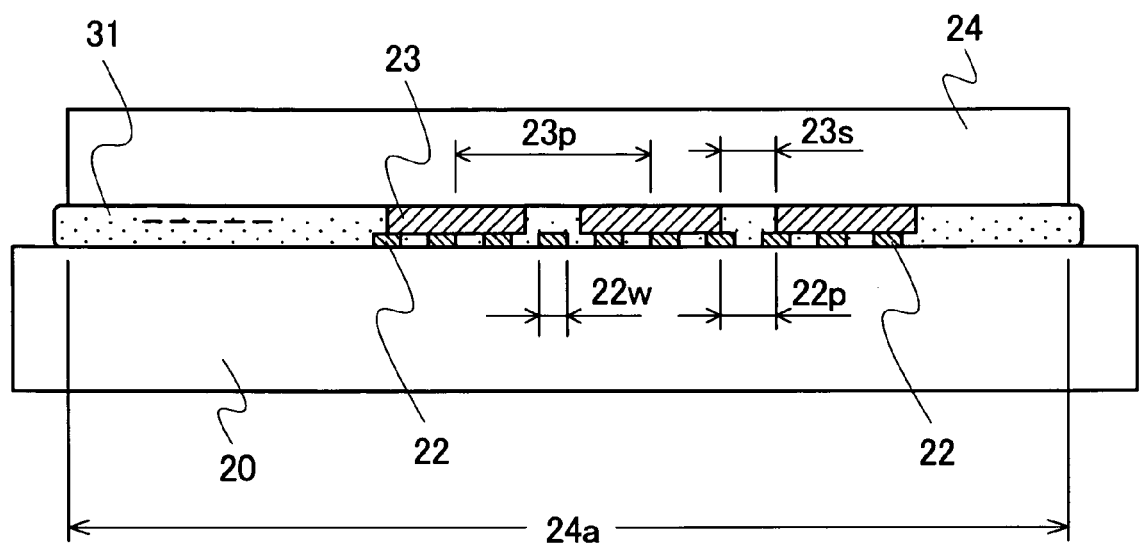
FIG. 6 is a cross-sectional view showing a mounting state of the semiconductor chip in FIG. 5.

FIG. 6 is a cross-sectional view showing a mounting state of the semiconductor chip (address detection IC) in FIG. 5.

Figure 7:
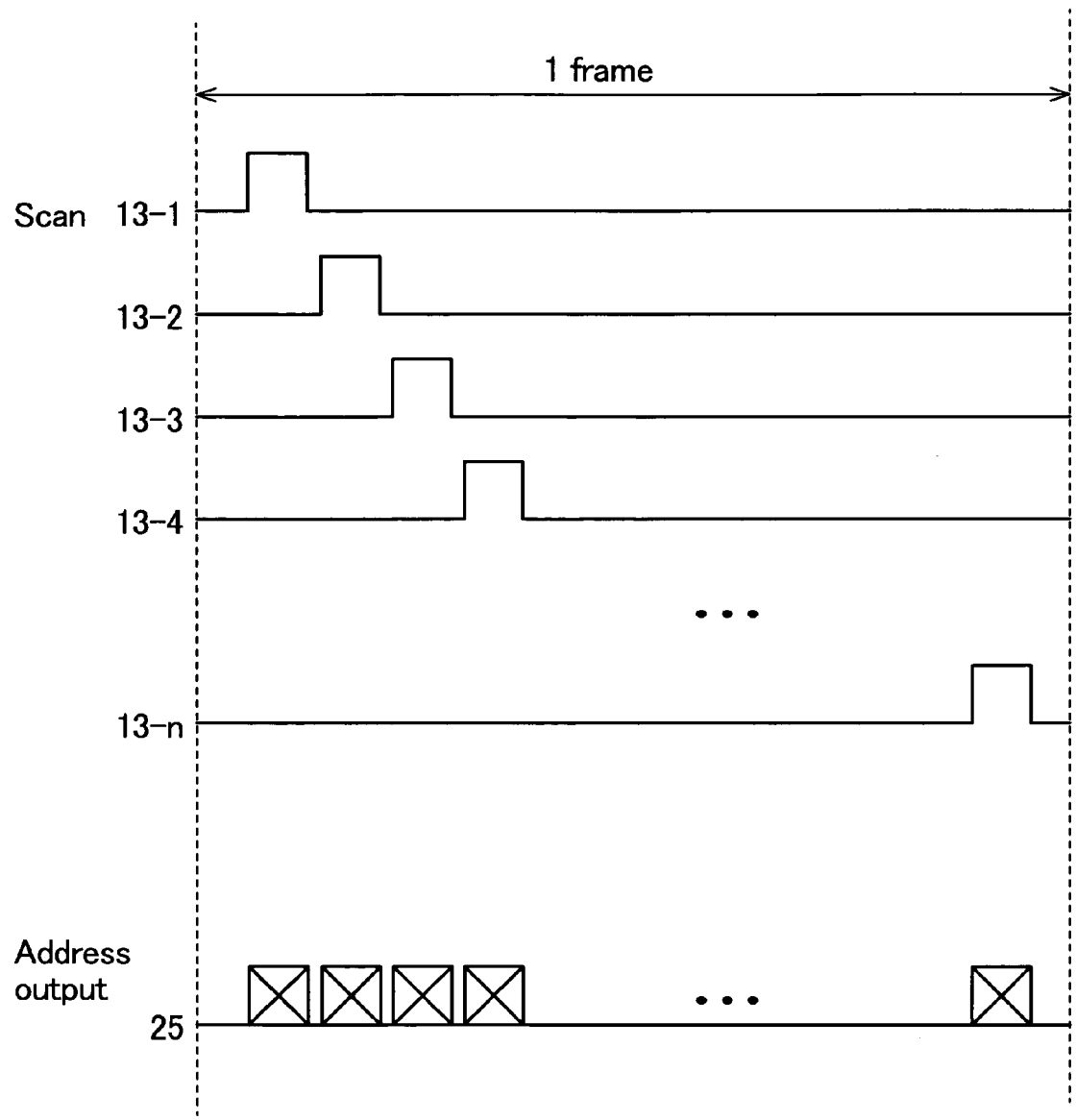
FIG. 7 is a timing chart showing a scanning waveform of an output bump electrode of the semiconductor chip in FIG. 3 and an output signal timing of an address signal output terminal of the semiconductor chip in FIG. 5.

FIG. 7 is a timing chart showing scanning waveforms of output bump electrodes of a semiconductor chip shown in FIG. 3 and output signal timing of address signal output terminals of the semiconductor chip in FIG. 5.

As shown in FIG. 1, the touch panel 40 is arranged on the display panel 50. The touch panel 40, as shown in FIG. 1 to FIG. 6, is configured to include a first substrate (upper substrate) 10 and a second substrate (lower substrate) 20 which are arranged to face each other with spacers 30 sandwiched therebetween, a semiconductor chip 14 which is mounted on the first substrate 10, and a semiconductor chip 24 which is mounted on the second substrate 20. The second substrate 20 is adhered to the display panel 50 at an upper portion of the display panel 50. The first substrate 10 is arranged on the second substrate 20 and is fixed to the second substrate 20 by a sealing material.

The first substrate 10 is formed of a TAC film or a PET film having optical isotropy, for example. As shown in FIG. 1 to FIG. 4, the first substrate 10 is configured to include, on a surface side thereof which faces the second substrate 20, a plurality of lines 11 which extends in the Y direction and is arranged parallel to each other in the X direction at predetermined intervals, a plurality of connection terminals (connection portions) 12 each of which is constituted of a portion of each line in the plurality of lines 11, and a chip mounting region 14a on which the semiconductor chip 14 is mounted.

On the semiconductor chip 14, a scanning circuit which is formed of an integrated circuit is mounted. The semiconductor chip 14 has a quadrangular planar shape, for example, a rectangular planar shape having long sides and short sides. On a main surface (circuit forming surface) of the semiconductor chip 14, a plurality of bump electrodes is arranged as terminals of the scanning circuit, and the plurality of bump electrodes includes a plurality of output bump electrodes 13 (see FIG. 2 to FIG. 4). As the plurality of bump electrodes of the semiconductor chip 14, for example, gold bumps which can be formed by plating are used. The plurality of output bump electrodes 13 is arranged in one direction. In this embodiment 1, for example, the plurality of output bump electrodes 13 is arranged in the long-side direction of the semiconductor chip 14.

Each line in the plurality of lines 11 is formed of a conductive body such as copper or stainless steel, for example. Each line in the plurality of connection terminals 12 is mounted on one end side of each line in the plurality of lines 11, and the plurality of connection terminals 12 is respectively arranged in the arrangement direction of the plurality of output bump electrodes 13 of the semiconductor chip 14 within the chip mounting region 14a of the first substrate 10. In the embodiment 1 of the present invention, the plurality of output bump electrodes 13 of the semiconductor chip 14 and the plurality of connection terminals 12 of the first substrate 10 are arranged in the X direction.

The semiconductor chip 14 is mounted on the chip mounting region 14a of the first substrate 10 in a state that the main surface (bump forming surface on which the bump electrodes 13 are formed) of the semiconductor chip 14 faces the first substrate 10 in an opposed manner, that is, in a state that the plurality of output bump electrodes 13 of the semiconductor chip 14 faces the plurality of connection terminals 12 of the first substrate 10 in an opposed manner (see FIG. 4).

As shown in FIG. 4, an anisotropic conductive film 31 which is referred to as an ACF is interposed between the first substrate 10 and the semiconductor chip 14 as an adhesive material, for example. As the anisotropic conductive film 31, for example, a film which is obtained by mixing a large number of conductive particles in an epoxy thermosetting insulation resin in a dispersed manner is used. That is, the semiconductor chip 14 is mounted on the chip mounting region 14a of the first substrate 10 by ACF mounting which mounts the semiconductor chip 14 in the chip mounting region 14a using the anisotropic conductive film 31. In the ACF mounting, the semiconductor chip 14 is bonded to the first substrate 10 by thermocompression bonding in a state that the anisotropic conductive film 31 is interposed between the first substrate 10 and the semiconductor chip 14 while heating the laminated structure, wherein the conductive particles in the inside of the anisotropic conductive film 31 are sandwiched between the connection terminals 12 of the first substrate 10 and the bump electrodes of the semiconductor chip 14. Accordingly, both pars, that is, the connection terminals and the bump electrodes are electrically and mechanically connected with each other.

The first substrate 10 includes an overlapping region where the first substrate 10 overlaps with the second substrate 20 in plane and a non-overlapping region where the first substrate 10 does not overlap with the second substrate 20 in plane, and the chip mounting region 14a on which the semiconductor chip 14 is mounted is arranged in the non-overlapping region of the first substrate 10 (see FIG. 2).

Here, the plurality of bump electrodes of the semiconductor chip 14 includes bump electrodes which are connected with the lines 15 to which timing signals are inputted (see FIG. 2 and FIG. 3).

An arrangement pitch 13p of the plurality of output bump electrodes 13 of the semiconductor chip 14 is set larger than an arrangement pitch 12p of the plurality of connection terminals 12 of the first substrate 10. That is, the number of the plurality of output bump electrodes 13 of the semiconductor chip 14 is set smaller than the number of the plurality of connection terminals 12 of the first substrate 10. Further, a width 12w of each line in the plurality of connection terminals 12 of the first substrate 10 is set smaller than an interval 13s between two neighboring output bump electrodes 13 of the semiconductor chip 14 (see FIG. 4).

A point which must be focused on here is that the connection relationship between the connection terminal 12 and the output bump electrode 13 is not established on a 1:1 basis but is established on a 2:1 basis or a 3:1 basis depending on the terminals. That is, the plurality of output bump electrodes 13 of the semiconductor chip 14 includes the output bump electrodes 13 which are connected with n (n≧2; n being integral number) or more pieces of connection terminals 12. According to the present invention, by allowing the connection terminals 12 and the output bump electrodes 13 to have such connection relationship, an operation for connecting the connection terminals 12 and the output bump electrodes 13 with each other requires no accurate alignment thus realizing a remarkable reduction of an assembling cost.

Further, the arrangement pitch of the lines 11 which overlap with the display part of the display panel 50 (in this embodiment, the organic EL display panel 51) in plane, that is, the arrangement pitch of the lines 11 on the pixels 201 differs from the arrangement pitch of the pixels 201 in the row direction. Also such pitch arrangement can make the accurate alignment unnecessary in the assembling operation of the first substrate 10 and the display panel 50 thus realizing the remarkable reduction of an assembling cost.

Here, the arrangement pitch of the lines 11 is designed such that a visual moiré of a human's eye becomes 1 mm or less with respect to the pitch of the pixels 201 in the row direction (X direction) so that the moiré cannot be seen by the human's eye. However, by setting the connection relationship between the connection terminals 12 and the output bump electrodes 13 to n≧2:1, the number of output bump electrodes 13 can be reduced thus realizing the reduction of a manufacturing cost of the semiconductor chip (scanning circuit IC) 14 on which the scanning circuit is mounted.

The second substrate 20 is formed of a TAC film or a PET film having optical isotropy, for example. As shown in FIG. 1, FIG. 2, FIG. 5 and FIG. 6, the second substrate 20 is configured to include, on a surface side thereof facing the first substrate 10, a plurality of lines 21 which extends in the X direction and is arranged parallel to each other in the Y direction at predetermined intervals, a plurality of connection terminals (connection portions) 22 each of which is constituted of a portion of each line in the plurality of lines 21, and a chip mounting region 24a on which the semiconductor chip 24 is mounted.

On the semiconductor chip 24, an address detection circuit which is formed of an integrated circuit is mounted. The semiconductor chip 24 has a quadrangular planar shape, for example, a rectangular planar shape having long sides and short sides. On a main surface (circuit forming surface) of the semiconductor chip 24, a plurality of bump electrodes is arranged as terminals of the address detection circuit, and the plurality of bump electrodes includes a plurality of input bump electrodes 23 (see FIG. 2, FIG. 5 and FIG. 6). As the plurality of bump electrodes of the semiconductor chip 24, for example, gold bumps which can be formed by plating are used. The plurality of input bump electrodes 23 is arranged in one direction. In this embodiment 1, for example, the plurality of input bump electrodes 23 is arranged in the long-side direction of the semiconductor chip 24.

Each line in the plurality of lines 21 is formed of a conductive body such as copper or stainless steel, for example. Each line in the plurality of connection terminals 22 is mounted on one end side of each line in the plurality of lines 21, and the plurality of connection terminals 22 is respectively arranged in the arrangement direction of the plurality of input bump electrodes 23 of the semiconductor chip 24 within the chip mounting region 24a of the second substrate 20. In the embodiment 1 of the present invention, the plurality of input bump electrodes 23 of the semiconductor chip 24 and the plurality of connection terminals 22 of the second substrate 20 are arranged in the Y direction.

The semiconductor chip 24 is mounted on the chip mounting region 24a of the second substrate 20 in a state that the main surface (bump forming surface on which the bump electrodes 23 are formed) of the semiconductor chip 24 faces the second substrate 20 in an opposed manner, that is, in a state that the plurality of input bump electrodes 23 of the semiconductor chip 24 faces the plurality of connection terminals 22 of the second substrate 20 in an opposed manner (see FIG. 6).

As shown in FIG. 6, the anisotropic conductive film 31 which is referred to as the ACF is interposed between the second substrate 20 and the semiconductor chip 24 as an adhesive material, for example. As the anisotropic conductive film 31, for example, a film which is obtained by mixing a large number of conductive particles in an epoxy thermosetting insulation resin in a dispersed manner is used. That is, the semiconductor chip 24 is mounted on the chip mounting region 24a of the second substrate 20 by ACF mounting which mounts the semiconductor chip 24 in the chip mounting region 24a using the anisotropic conductive film 31. In the ACF mounting, the semiconductor chip 24 is bonded to the second substrate 20 by thermocompression bonding in a state that the anisotropic conductive film 31 is interposed between the second substrate 20 and the semiconductor chip 24 while heating the laminated structure, wherein the conductive particles in the inside of the anisotropic conductive film 31 are sandwiched between the connection terminals 22 of the second substrate 20 and the bump electrodes of the semiconductor chip 24. Accordingly, both pars, that is, the connection terminals and the bump electrodes are electrically and mechanically connected with each other.

The second substrate 20 includes an overlapping region where the second substrate 20 overlaps with the first substrate 10 in plane and a non-overlapping region where the second substrate 20 does not overlap with the first substrate 10 in plane, and the chip mounting region 24a on which the semiconductor chip 24 is mounted is arranged in the non-overlapping region of the second substrate 20 (see FIG. 2).

Here, the plurality of bump electrodes of the semiconductor chip 24 includes address signal output bump electrodes 25 (see FIG. 2 and FIG. 5).

An arrangement pitch 23p of the plurality of input bump electrodes 23 of the semiconductor chip 24 is set larger than an arrangement pitch 22p of the plurality of connection terminals 22 of the second substrate 20. That is, the number of the plurality of input bump electrodes 23 of the semiconductor chip 24 is set smaller than the number of the plurality of connection terminals 22 of the second substrate 20. Further, a width 22w of each line in the plurality of connection terminals 22 of the second substrate 20 is set smaller than an interval 23s between two neighboring input bump electrodes 23 of the semiconductor chip 24 (see FIG. 6).

A point which must be focused on also here is that the connection relationship between the connection terminal 22 and the input bump electrode 23 is not established on a 1:1 basis but is established on a 2:1 basis or a 3:1 basis depending on terminals, and there also exists the connection terminal 22 which are not connected with the input bump electrode 23 in the plurality of input bump electrode 23 depending on the relationship of the arrangement pitch thereof. That is, the plurality of input bump electrodes 23 of the semiconductor chip 24 also includes the input bump electrodes 23 which are connected with n (n≧2; n being integral number) or more pieces of connection terminals 22. According to the present invention, by allowing the connection terminals 22 and the input bump electrodes 23 to have such connection relationship, an operation for connecting the connection terminals 22 and the input bump electrodes 23 requires no accurate alignment thus realizing a remarkable reduction of an assembling cost.

Further, the arrangement pitch of the lines 21 which overlap with the display part of the display panel 50 (in this embodiment, the organic EL display panel 51) in plane, that is, the arrangement pitch of the lines 21 on the pixels 201 differs from the arrangement pitch of the pixels 201 in the columnar direction (Y direction). Also such pitch arrangement can make the accurate alignment unnecessary in the assembling operation of the second substrate 20 and the display panel 50 thus realizing the remarkable reduction of an assembling cost.

Here, the arrangement pitch of the lines 21 is designed such that a visual moiré of a human's eye becomes 1 mm or less with respect to the pitch of the pixels 201 in the columnar direction (Y direction) so that the moiré cannot be seen by the human's eye. However, by setting the connection relationship between the connection terminals 22 and the input bump electrodes 23 to n≧2:1, the number of input bump electrodes 23 can be reduced thus realizing the reduction of a manufacturing cost of the semiconductor chip (address detection IC) 24 on which the address detection circuit is mounted.

Next, a driving method of the touch panel 40 which is constituted of the first substrate 10 and the second substrate 20 is explained in conjunction with FIG. 7.

FIG. 7 is a timing chart showing scanning waveforms of the output bump electrodes of the semiconductor chip (scanning circuit IC) shown in FIG. 3 and output signal timing of the address signal output terminal of the semiconductor chip (address detection IC) shown in FIG. 5.

The display screen (organic EL display panel 51) is usually operated at a frequency of 60 Hz. However, for realizing high-speed character inputting, the touch panel 40 is operated at a high-speed frame frequency (1 frame=120 Hz to 240 Hz). In such a frame frequency period, n pieces of output bump electrodes 13 are sequentially scanned. Here, for every scanning timing of each output bump electrode 13, to the address signal output bump electrode 25 of the semiconductor chip (address detection IC) 24, an address of the input bump electrode 23 for detecting a scanning waveform of the output bump electrode 13 is outputted as data. That is, when a pressure is applied to the touch panel 40 by a finger, a stylus pen or the like, the line 11 and the line 21 are brought into contact with each other at a pressure-applied portion of the touch panel 40 so that the output bump electrode 13 and the input bump electrode 23 corresponding to the pressure-applied portion are electrically connected with each other.

Due to such constitution, according to the display device of the present invention, not to mention the simultaneous detection of touching at one point or at two points, the simultaneous detection of touching at a plurality of points such as at five points or at ten points can be performed in real time.

Further, by detecting an electric resistance between the output bump electrode 13 and the input bump electrode 23, it is possible to detect a touching strength.

Finally, the structure of the lines 11 and the lines 21 is explained in conjunction with FIG. 1.

The spacers 30 are interposed between the first substrate 10 and the second substrate 20. When a pushing pressure is applied to the first substrate 10 in the direction indicated by an arrow in the drawing, the spacers 30 are deformed due to the pressure so that the line 11 and the line 21 are brought into contact with each other whereby these lines 11, 21 are electrically connected with each other. Here, by forming the line 11 and the line 12 using the same metal, the reliability of pushing can be further enhanced.

The lines 11 and the lines 12 can be manufactured as follows.

In forming the substrate, for example, to a sheet film which is formed of a TAC film or a PET film and has a film thickness of approximately 200 μm, a metal thin film having a film thickness of 10 μm, for example, is adhered using an adhesive material or the like. Subsequently, a photoresist is applied to the metal thin film by coating and, thereafter, fine and accurate electrode lines are formed by performing exposure, developing and etching.

Here, when a film having optical isotropy such as a TAC film is used as the sheet film, a circular polarizer for preventing a reflection light in an organic EL display may be mounted on the touch panel. In this case, the reflection of an external light attributed to the lines 11 and the lines 21 can be also prevented and hence, it is possible to suppress the lowering of contrast with respect to a reflection light.

On the other hand, by using the PET film or the like as the sheet film, a manufacturing cost of the sheet films on a mass production basis can be further reduced.

Embodiment 2

Figure 10:
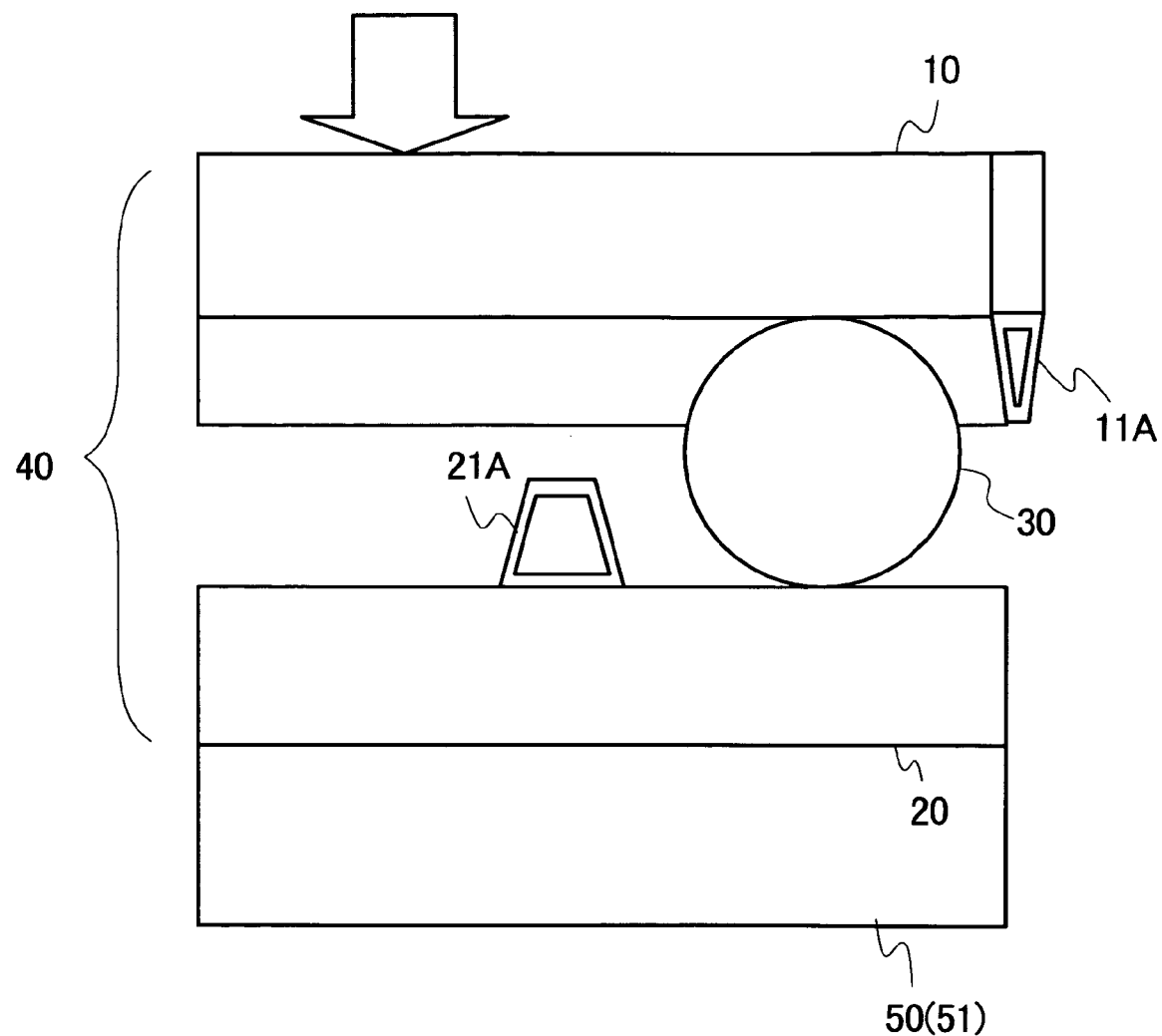
FIG. 10 is a cross-sectional view of a display device having a touch panel of an embodiment 2 according to the present invention.

FIG. 10 is a cross-sectional view of a display device having a touch panel of an embodiment 2 according to the present invention.

The basic structure and the manner of operation of the embodiment 2 of the present invention are substantially equal to the above-mentioned structure and manner of operation of the embodiment 1 and hence, their repeated explanation is omitted. The difference between the embodiment 1 and the embodiment 2 lies in the arrangement structure of the lines 11 and the lines 21 and hence, the structure of the lines 11 and the lines 21 is explained in conjunction with FIG. 10.

Lines 11A which are formed of a conductive body such as copper or STAINLESS STEEL are linearly arranged on a first substrate 10. Further, Lines 21A which are formed of a conductive body such as copper or STAINLESS STEEL are linearly arranged on a second substrate 20. Spacers 30 are interposed between the first substrate 10 and the second substrate 20. When a pressure is applied to the first substrate 10 in the direction indicated by an arrow in the drawing, the spacers 30 are deformed due to the pressure, and the line 11A and the Line 21A are brought into contact with each other and are electrically connected with each other.

Here, blacking is applied to surfaces of the lines 11A and surfaces of the lines 21A by oxidation processing. Accordingly, this embodiment can acquire an advantageous effect that the lowering of contrast attributed to an external light caused by an optical reflection on a substrate adhering surface of the line 11A, on a substrate non-adhering surface of the line 21A or the like can be effectively prevented.

Here, in the above-mentioned embodiments, the explanation has been made with respect to the display device having a touch panel which arranges the touch panel on the organic EL display panel as one example of a display panel. However, the present invention is not limited to such an example and is applicable to a display device having a touch panel which arranges the touch panel on other display panel such as a liquid crystal display panel or an inorganic EL display panel.

Here, the relationship between the pitch of the line connection portions (connection pads) and the pitch of the bump electrodes as well as the relationship between the number of line connection portions and the number of bump electrodes are adopted by the display device having the structure in which the semiconductor chip is directly mounted on the substrate which constitutes the touch screen for a user. When the above-mentioned relationships are applied to line connection portions of other substrate on which the semiconductor chip is mounted by TCP or a COF, the pitch of bump electrodes of the semiconductor chip is replaced with a pitch of the line connection portions of other substrate on which the semiconductor chip is mounted, the pitch of the line connection portions (line pads) of the substrate which constitutes the touch panel is set narrower than the pitch of the line connection portions of the substrate on which the semiconductor chip is mounted and, further, the number of line connection portions of the substrate which constitutes the touch panel is set larger than the number of line connection portions of the substrate on which the semiconductor chip is mounted.

Although the present invention has been specifically explained in conjunction with the embodiments heretofore, it is needless to say that the present invention is not limited to the above-mentioned embodiments and various modifications are conceivable without departing from the gist of the present invention.

What is claimed is:

1. A display device having a touch panel comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions is arranged in the arrangement direction of the plurality of first bump electrodes within the first-chip mounting region, and
the number of the plurality of first bump electrodes is set smaller than the number of the plurality of first connection portions.

2. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions are arranged in the arrangement direction of the plurality of first bump electrodes within the first-chip mounting region,
an arrangement pitch of the plurality of first bump electrodes is set larger than an arrangement pitch of the plurality of first connection portions, and
the plurality of first connection portions includes a connection portion which is not connected with the first bump electrode.

3. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions are arranged in the arrangement direction of the plurality of first bump electrodes within the first-chip mounting region,
an arrangement pitch of the plurality of first bump electrodes is set larger than an arrangement pitch of the plurality of first connection portions, and the plurality of first bump electrodes includes bump electrodes which are connected with n (n.gtoreq.2) or more pieces of first connection portions.

4. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions are arranged in the arrangement direction of the plurality of first bump electrodes within the first-chip mounting region,
an arrangement pitch of the plurality of first bump electrodes is set larger than an arrangement pitch of the plurality of first connection portions, and
a width of each line in the plurality of first connection portions is set smaller than a distance between two neighboring first bump electrodes.

5. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions are arranged in the arrangement direction of the plurality of first bump electrodes within the first-chip mounting region,
an arrangement pitch of the plurality of first bump electrodes is set larger than an arrangement pitch of the plurality of first connection portions, and
the touch panel includes a second semiconductor chip which is mounted on the second substrate,
the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines,
the second semiconductor chip includes a plurality of second bump electrodes which is arranged in one direction,
the plurality of second connection portions is arranged in the arrangement direction of the plurality of second bump electrodes within a second-chip mounting region, and
the number of the plurality of second bump electrodes is set smaller than the number of the plurality of second connection portions.

6. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines,
the first semiconductor chip includes a plurality of first bump electrodes which is arranged in one direction,
the plurality of first connection portions are arranged in the arrangement direction of the plurality of first bump electrodes within the first-chip mounting region,
an arrangement pitch of the plurality of first bump electrodes is set larger than an arrangement pitch of the plurality of first connection portions,
the touch panel includes a second semiconductor chip which is mounted on the second substrate,
the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines,
the second semiconductor chip includes a plurality of second bump electrodes which is arranged in one direction,
the plurality of second connection portions is arranged in the arrangement direction of the plurality of second bump electrodes within a second-chip mounting region,
an arrangement pitch of the plurality of second bump electrodes is set larger than an arrangement pitch of the plurality of second connection portions, and
the plurality of second connection portions includes a connection portion which is not connected with the second bump electrode.

7. A display device having a touch panel, comprising:
a display panel; and
a touch panel which is arranged on the display panel in an overlapping manner in plane, wherein
the touch panel includes a first substrate and a second substrate which are arranged to face each other with spacers sandwiched therebetween, and a first semiconductor chip which is mounted on the first substrate,
the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines, the first semiconductor chip includes a plurality of first bump electrodes which is arranged in one direction, the plurality of first connection portions are arranged in the arrangement direction of the plurality of first bump electrodes within the first-chip mounting region, an arrangement pitch of the plurality of first bump electrodes is set larger than an arrangement pitch of the plurality of first connection portions, the touch panel includes a second semiconductor chip which is mounted on the second substrate, the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines, the second semiconductor chip includes a plurality of second bump electrodes which is arranged in one direction, the plurality of second connection portions is arranged in the arrangement direction of the plurality of second bump electrodes within a second-chip mounting region, an arrangement pitch of the plurality of second bump electrodes is set larger than an arrangement pitch of the plurality of second connection portions, and the plurality of second bump electrodes include bump electrodes which are connected with n (n.gtoreq.2) or more pieces of second connection portions.

8. A display device having a touch panel, comprising:

a display panel; and a touch panel which is arranged on the display panel in an overlapping manner in plane, wherein the touch panel includes a first substrate and a second substrate which are arranged to face each other with spacers sandwiched therebetween, and a first semiconductor chip which is mounted on the first substrate, the first substrate includes, on a surface side thereof which faces the second substrate, a plurality of first lines which is arranged parallel to each other in the first direction, a first-chip mounting region on which the first semiconductor chip is mounted, and a plurality of first connection portions each of which is constituted of a portion of each line in the plurality of first lines, the first semiconductor chip includes a plurality of first bump electrodes which is arranged in one direction, the plurality of first connection portions are arranged in the arrangement direction of the plurality of first bump electrodes within the first-chip mounting region, an arrangement pitch of the plurality of first bump electrodes is set larger than an arrangement pitch of the plurality of first connection portions, the touch panel includes a second semiconductor chip which is mounted on the second substrate, the second substrate includes, on a surface side thereof which faces the first substrate, a plurality of second lines which is arranged parallel to each other in the second direction which intersects with the first direction, a second chip mounting region on which the second semiconductor chip is mounted, and a plurality of second connection portions each of which is constituted of a portion of each line in the plurality of second lines, the second semiconductor chip includes a plurality of second bump electrodes which is arranged in one direction, the plurality of second connection portions is arranged in the arrangement direction of the plurality of second bump electrodes within a second-chip mounting region, an arrangement pitch of the plurality of second bump electrodes is set larger than an arrangement pitch of the plurality of second connection portions, and a width of each line in the plurality of second connection portions is set smaller than a distance between two neighboring second bump electrodes.

\* \* \* \* \*